US009613093B2

(12) United States Patent
Clark et al.

(10) Patent No.: US 9,613,093 B2
(45) Date of Patent: Apr. 4, 2017

(54) USING QUESTION ANSWERING (QA) SYSTEMS TO IDENTIFY ANSWERS AND EVIDENCE OF DIFFERENT MEDIUM TYPES

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 14/515,587

(22) Filed: Oct. 16, 2014

(65) Prior Publication Data

US 2016/0110415 A1    Apr. 21, 2016

(51) Int. Cl.
*G06F 17/30*        (2006.01)

(52) U.S. Cl.
CPC .. *G06F 17/30451* (2013.01); *G06F 17/30637* (2013.01)

(58) Field of Classification Search
CPC .............. G06F 17/30; G06F 17/30424; G06F 17/30539; G06F 17/30637; G06F 17/30451
USPC ................................................. 707/600–899
See application file for complete search history.

(56) References Cited

U.S. PATENT DOCUMENTS

| | | |
|---|---|---|
| 6,901,399 B1 | 5/2005 | Corston et al. |
| 7,487,072 B2 | 2/2009 | Semple et al. |
| 7,580,835 B2 | 8/2009 | Ichimura |
| 8,332,394 B2 | 12/2012 | Fan et al. |
| 8,600,986 B2 | 12/2013 | Fan et al. |
| 2007/0078842 A1 | 4/2007 | Zola et al. |
| 2010/0138402 A1* | 6/2010 | Burroughs ........ G06F 17/30684 707/706 |

FOREIGN PATENT DOCUMENTS

WO    2013170587 A1    11/2013

OTHER PUBLICATIONS

Clark et al., "Using Question Answering (QA) Systems to Identify Answers and Evidence of Different Medium Types," U.S. Appl. No. 14/549,629, filed Nov. 21, 2014.
IBM, "List of IBM Patents or Patent Applications Treated as Related.".
Budzik, J. et al., "Information access in context," Knowledge-Based Systems 14 (2001) 37-53, www.elsevier.com/locate/knosys, Copyright 2001 Elsevier Science.

(Continued)

*Primary Examiner* — Isaac M Woo
(74) *Attorney, Agent, or Firm* — Nicholas D. Bowman

(57) ABSTRACT

First, a computer may receive an input query of a first medium type. The input query may then be analyzed. Based on the analysis, the input query may be categorized as being associated with at least a second medium type. A first-medium-type search of a set of corpora may then be performed. Based on the results of the first-medium-type search, a candidate answer of the first medium type may be generated. In response to the categorizing, a second-medium-type search of the set of corpora may also be performed.

14 Claims, 9 Drawing Sheets

(56) References Cited

OTHER PUBLICATIONS

Jeon, J. et al., "A Framework to Predict the Quality of Answers with Non-Textual Features," SIGIR'06, Aug. 6-10, 2006, Seattle, Washington, USA, Copyright 2006 ACM 1-59593-369—Jul. 6, 0008.
Zhang, J. et al., "Efficient Query Evaluation on Large Textual Collections in a Peer-to-Peer Environment," CIS Department, Polytechnic University, Brooklyn, NY.

* cited by examiner

USING QUESTION ANSWERING (QA) SYSTEMS TO IDENTIFY ANSWERS AND EVIDENCE OF DIFFERENT MEDIUM TYPES

BACKGROUND

The present disclosure relates to computer systems, and more specifically, to question answering (QA) systems.

Recent research has been directed to developing QA systems designed to receive input questions, analyze them, and return applicable answers. These systems may rely on natural language processing, automated reasoning, machine learning, and other advanced techniques. Using these techniques, QA systems may provide mechanisms for searching corpora (e.g., large bodies of source items containing relevant content) and analyzing the content with regard to a given input query in order to determine an answer to the question. In some QA systems, this may take the form of hypothesis generation, confidence scoring, and ranking in order to determine a final set of one or more output candidate answers.

SUMMARY

According to embodiments of the present disclosure, aspects of the disclosure may include a method, a system, and a computer program product. First, a computer may receive an input query of a first medium type. The input query may then be analyzed. Based on the analysis, the input query may be categorized as being associated with at least a second medium type. A first-medium-type search of a set of corpora may then be performed. Based on the results of the first-medium-type search, a candidate answer of the first medium type may be generated. In response to the categorizing, a second-medium-type search of the set of corpora may also be performed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of some embodiments and do not limit the disclosure.

Figure 1:
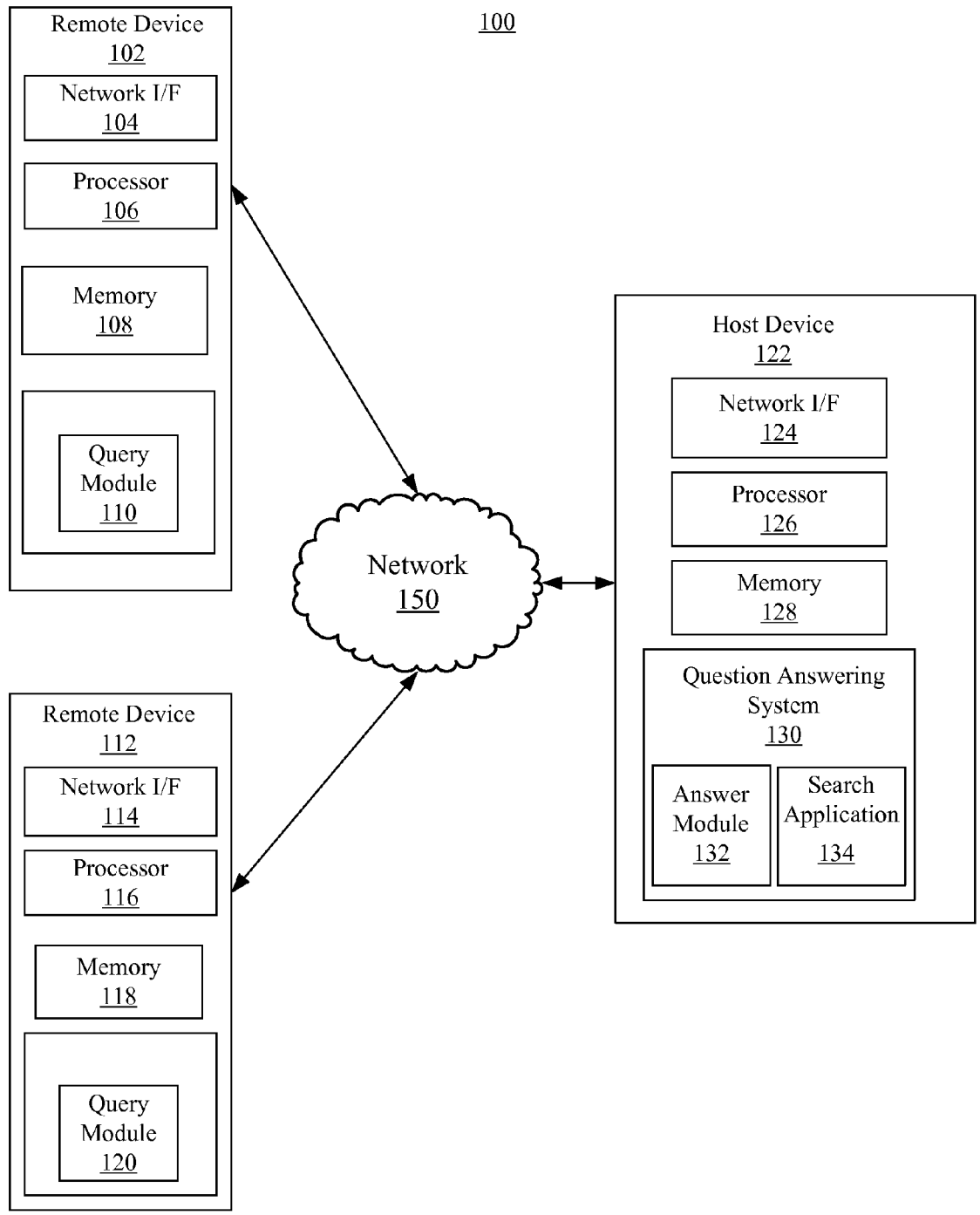
FIG. 1 illustrates a block diagram of an example computing environment for use with a question answering (QA) system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question answering (QA) systems. While the present disclosure is not necessarily limited to such applications, various aspects of the disclosure may be appreciated through a discussion of various examples using this context. Furthermore, it is contemplated that some embodiments may use or take the form of computer systems that may not be QA systems.

Often times, the use of QA systems may be more focused on words (e.g., text) rather than on other, non-textual medium types (such as content that is of an image type, an audio type, a video type, etc.). For example, some QA systems may be primarily configured to receive textual input queries (e.g., user questions), analyze textual source items (e.g., sources of information such as literature), and, based on the analysis, output textual candidate answers to the user. In some situations, this focus on textual content may be appropriate. This may be particularly true in situations where a textual search is likely to produce reliable, accurate results, or, conversely, in situations where a non-textual-medium-type search is unlikely to yield material of value. For example, searching a corpus of pictures (e.g., image-type source items) might be of only limited use when trying to solve a complex algebraic equation. Moreover, in situations where non-textual-medium-type searches are associated with higher resource costs (in terms of time, money, etc.), they may not be worth the price, potentially even when such searches may be likely to produce better answers to input queries than their textual counterparts.

On the other hand, non-textual-type content may be put to valuable use in QA systems under some circumstances. For example, by analyzing images, or other non-textual-medium-type source items, a QA system may be able to extract data from the non-textual source items (both textual and non-textual data) and use this extracted data to produce better answers than could be produced using textual searches. Furthermore, some input questions are best answered with non-textual candidate answers. Indeed, in some situations, the old adage that "a picture is worth a thousand words" may be as true in reference to QA systems as it is anywhere. That is to say, a non-textual candidate answer may be inherently more likely to be accurate or complete, than its textual counterpart. For example, in response the question "What color is a sunset?" it may be a better answer to produce a picture of a sunset than to produce a paragraph describing the different combinations of hues that are created when the sun goes down.

Given that non-textual-medium-type searches may have value in some circumstances and not in others, there may be some advantage in being able to predict the situations in which these searches should be performed. Specifically, in some situations, analyzing an input question itself may be helpful in predicting whether a non-textual-medium-type search should be performed as part of attempting to answer that question. Furthermore, there may be some advantage in using textual data and non-textual data extracted from non-textual source items in order to obtain quality candidate answers.

In some embodiments, aspects of the present disclosure may include receiving, by a QA system, an input query of a first medium type (e.g., textual type) from a user. The input query may be analyzed, and, based on the analysis, a determination may be made that the input query is associated with a second medium type (e.g., image type) and the input query may be categorized accordingly. A first-medium-type search of a corpus may then be performed and a first-medium-type candidate answer may be generated thereby. The QA system may then calculate a confidence score for that candidate answer and compare the confidence score to a threshold (e.g., minimum) confidence score. If the confidence score is below the threshold, a second-medium-type search may be performed. As a result of the second-medium-type search, a second candidate answer may be generated and presented to the user.

In some embodiments, searches (e.g., first-medium-type searches, second-medium-type searches) performed as part of the methods described herein may include the steps of extracting data from source items and processing this extracted data. This extracted data may be either of a textual type or of non-textual type. The extracted data may then be analyzed as part of generating candidate answers. Further, in some embodiments, a plurality of factors may be used in determining whether a second-medium-type search should be performed in any particular case. These factors may include, for example, the cost of performing a second-medium-type search.

As discussed above, aspects of the disclosure may relate to QA systems. Accordingly, an understanding of the embodiments of the present invention may be aided by describing embodiments of these QA systems and the environments in which these systems may operate. Turning now to the figures, shown in FIG. 1 a block diagram of an example computing environment 100 for use with a QA system, in accordance with embodiments of the present disclosure. In some embodiments, the computing environment 100 may include one or more remote devices 102, 112 and one or more host devices 122. Remote devices 102, 112 and host device 122 may be distant from each other and communicate over a network 150 in which the host device 122 comprises a central hub from which remote devices 102, 112 may establish a communication connection. Alternatively, the host device and remote devices may be configured in any other suitable relationship (e.g., in a peer-to-peer or other relationship).

In some embodiments, the network 150 may be implemented by any number of any suitable communications media (e.g., wide area network (WAN), local area network (LAN), Internet, Intranet). Alternatively, remote devices 102, 112 and host devices 122 may be local to each other, and communicate via any appropriate local communication medium (e.g., local area network (LAN), hardwire, wireless link, Intranet). In some embodiments, the network 150 may be implemented within a cloud computing environment, or using one or more cloud computing services. Consistent with various embodiments, a cloud computing environment may include a network-based, distributed data processing system that provides one or more cloud computing services. Further, a cloud computing environment may include any number of computers (e.g., hundreds or thousands of them or more), disposed within one or more data centers and configured to share resources over the network 150.

In some embodiments, host device 122 may include a QA system 130 having a search application 134 and an answer module 132. The search application 134 may be implemented by a conventional or other search engine, and may be distributed across multiple computer systems. The search application 134 may be configured to search one or more databases or other computer systems for content that is related to a question input by a user at a remote device 102, 112.

In some embodiments, remote devices 102, 112 may enable users to submit input queries (e.g., search requests or other user queries) to host devices 122 to retrieve search results. For example, the remote devices 102, 112 may include a query module 110, 120 (e.g., in the form of a web browser or any other suitable software module) and present a graphical user interface or other interface (command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 may be computer systems, and may each be equipped with a display or monitor. The computer systems may include at least one processor 106, 116, 126; memories 108, 118, 128; internal or external network interface or communications devices 104, 114, 124 (e.g., modem, network interface cards); optional input devices (e.g., a keyboard, mouse, touchscreen, or other input device); and any commercially available or custom software (e.g., browser software, communications software, server software, natural language processing software, search engine and/or web crawling software, filter modules for filtering content based upon predefined criteria). In some embodiments, the computer systems may include servers, desktops, laptops, and hand-held devices. In addition, the answer module 132 may include one or more modules or units to perform the various functions of embodiments as described below (receiving an input query, determining whether an input query is associated with a non-textual medium type, etc.), and may be implemented by any combination of any quantity of software and/or hardware modules or units.

Figure 2:
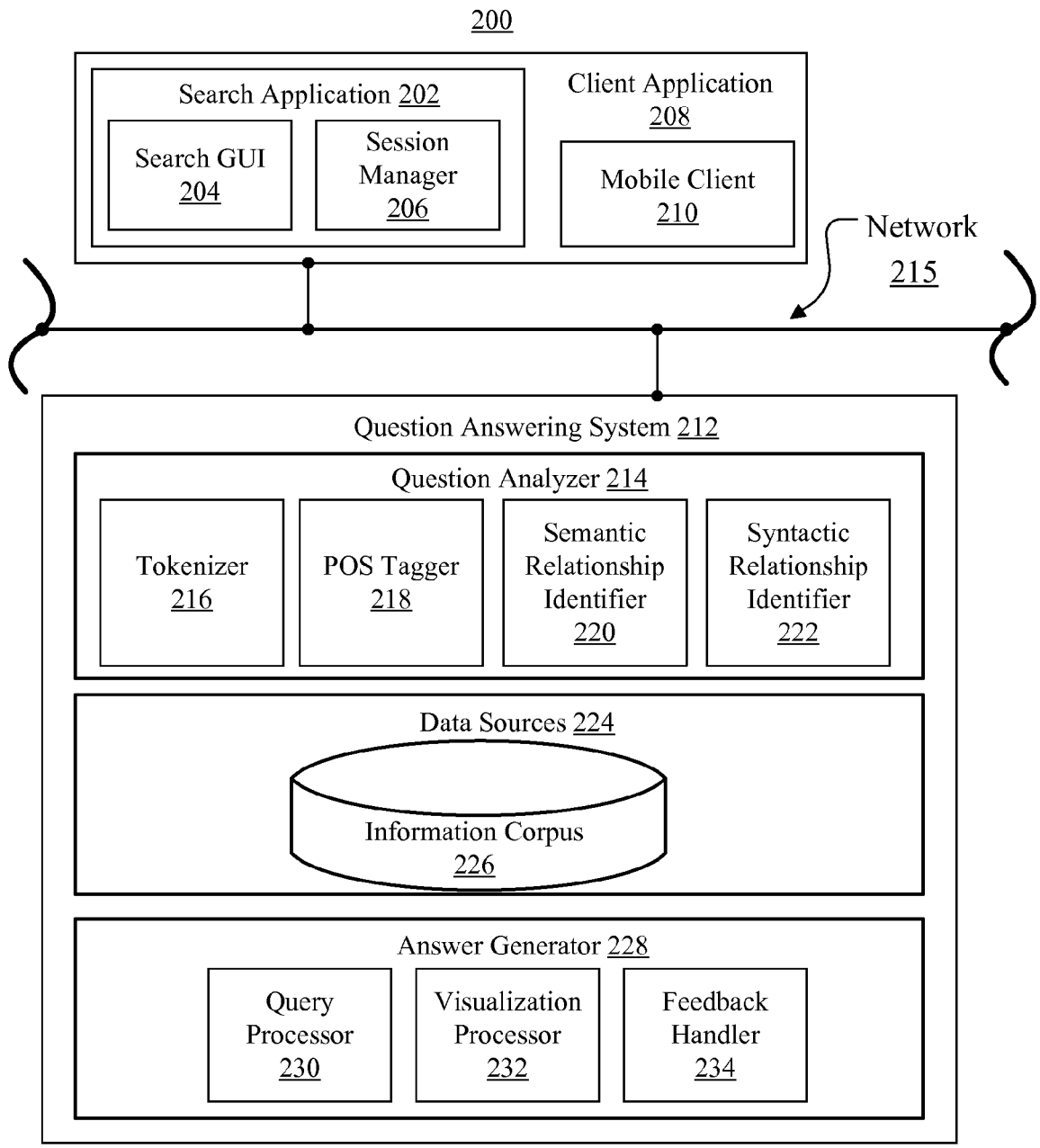
FIG. 2 illustrates a block diagram of an example QA system configured to generate answers to one or more input queries, in accordance with embodiments of the present disclosure.

Turning now to FIG. 2, shown is a block diagram of an example QA system configured to generate answers to one or more input queries, in accordance with embodiments of the present disclosure. Aspects of FIG. 2 are directed toward an exemplary system architecture 200, including a QA system 212 to generate answers to user queries (e.g., input questions). In some embodiments, one or more users may send requests for information to QA system 212 using a remote device (such as remote devices 102, 112 of FIG. 1). Such a remote device may include a client application 208 which may itself involve one or more entities operable to generate information that is then dispatched to QA system 212 via network 215. QA system 212 may be able to perform methods and techniques for responding to the requests sent by the client application 208. In some embodiments, the information received at QA system 212 may correspond to input questions received from users, where the input questions may be expressed in natural language, or images, or other forms.

A question (similarly referred to herein as an input query) may be one or more words that form a search term or request for data, information, or knowledge. A question may be expressed in the form of one or more keywords. Questions may include various selection criteria and search terms. A question may be composed of complex linguistic features in addition to keywords. However, a keyword-based search for answers may also be possible. In some embodiments, using restricted syntax for questions posed by users may be enabled. The use of restricted syntax may result in a variety of alternative expressions that assist users in better stating their needs. In some embodiments, input questions may be implied (rather than explicit) questions. Furthermore, in some embodiments, questions may be audio-type (e.g., spoken-word recordings, music, scientific sound recordings), video-type (e.g., a film, a silent movie, a video of a person asking a detailed question), image-type (e.g., a picture, a photograph, a drawing), or any other type that may be received and processed by the QA system.

In some embodiments, client application 208 may operate on a variety of devices. Such devices may include, but are not limited to, mobile and hand-held devices (e.g., laptops, mobile phones, personal or enterprise digital assistants, and the like), personal computers, servers, or other computer systems that access the services and functionality provided by QA system 212. In some embodiments, client application 208 may include one or more components, such as a mobile client 210. Mobile client 210, acting as an agent of client application 208, may dispatch user query requests to QA system 212.

Consistent with various embodiments, client application 208 may also include a search application 202, either as part of mobile client 210 or separately, that may perform several functions, including some or all of the above functions of mobile client 210 listed above. For example, in some embodiments, search application 202 may dispatch requests for information to QA system 212. In some embodiments, search application 202 may be a client application to QA system 212. Search application 202 may send requests for answers to QA system 212. Search application 202 may be installed on a personal computer, a server, or other computer system.

In some embodiments, search application 202 may include a search graphical user interface (GUI) 204 and session manager 206. In such situations, users may be able to enter questions in search GUI 204. In some embodiments, search GUI 204 may be a search box or other GUI component, the content of which may represent a question to be submitted to QA system 212. Users may authenticate to QA system 212 via session manager 206. In some embodiments, session manager 206 may keep track of user activity across sessions of interaction with the QA system 212. Session manager 206 may also keep track of what questions are submitted within the lifecycle of a session of a user. For example, session manager 206 may retain a succession of questions posed by a user during a session. In some embodiments, answers produced by QA system 212 in response to questions posed throughout the course of a user session may also be retained. Information for sessions managed by session manager 206 may be shared between computer systems and devices.

In some embodiments, client application 208 and QA system 212 may be communicatively coupled through network 215, e.g., the Internet, intranet, or other public or private computer network. In some embodiments, QA system 212 and client application 208 may communicate by using Hypertext Transfer Protocol (HTTP) or Representational State Transfer (REST) calls. In some embodiments, QA system 212 may reside on a server node. Client application 208 may establish server-client communication with QA system 212 or vice versa. In some embodiments, the network 215 may be implemented within a cloud computing environment, or using one or more cloud computing services.

Consistent with various embodiments, QA system 212 may respond to the requests for information sent by client applications 208 (e.g., questions posed by users). QA system 212 may generate answers to the received questions. In some embodiments, QA system 212 may include a question analyzer 214, data sources 224, and answer generator 228. Question analyzer 214 may be a computer module that analyzes the received questions. Question analyzer 214 may perform various methods and techniques for analyzing the questions (syntactic analysis, semantic analysis, image recognition analysis, etc.). In some embodiments, question analyzer 214 may parse received questions. Question analyzer 214 may include various modules to perform analyses of received questions. For example, computer modules that question analyzer 214 may encompass include, but are not limited to, a tokenizer 216, part-of-speech (POS) tagger 218, semantic relationship identifier 220, and syntactic relationship identifier 222.

In some embodiments, tokenizer 216 may be a computer module that performs lexical analysis. Tokenizer 216 may convert a sequence of characters into a sequence of tokens. A token may be a string of characters typed by a user and categorized as a meaningful symbol. Further, in some embodiments, tokenizer 216 may identify word boundaries in an input question and break the question or any text into its component parts such as words, multiword tokens, numbers, and punctuation marks. In some embodiments, tokenizer 216 may receive a string of characters, identify the lexemes in the string, and categorize them into tokens.

Consistent with various embodiments, POS tagger 218 may be a computer module that marks up a word in a text to correspond to a particular part of speech. POS tagger 218 may read a question or other text in natural language and assign a part of speech to each word or other token. POS tagger 218 may determine the part of speech to which a word corresponds based on the definition of the word and the context of the word. The context of a word may be based on its relationship with adjacent and related words in a phrase, sentence, question, or paragraph. In some embodiments, the context of a word may be dependent on one or more previously posed questions. Examples of parts of speech that may be assigned to words include, but are not limited to, nouns, verbs, adjectives, adverbs, and the like. Examples of other part of speech categories that POS tagger 218 may assign include, but are not limited to, comparative or superlative adverbs, wh-adverbs, conjunctions, determiners, negative particles, possessive markers, prepositions, wh-pronouns, and the like. In some embodiments, POS tagger 218 may tag or otherwise annotate tokens of a question with part of speech categories. In some embodiments, POS tagger 218 may tag tokens or words of a question to be parsed by QA system 212.

In some embodiments, semantic relationship identifier 220 may be a computer module that may identify semantic relationships of recognized entities (e.g., words, phrases) in questions posed by users. In some embodiments, semantic relationship identifier 220 may determine functional dependencies between entities and other semantic relationships.

Consistent with various embodiments, syntactic relationship identifier 222 may be a computer module that may identify syntactic relationships in a question composed of tokens posed by users to QA system 212. Syntactic relationship identifier 222 may determine the grammatical structure of sentences, for example, which groups of words are associated as "phrases" and which word is the subject or object of a verb. Syntactic relationship identifier 222 may conform to formal grammar.

In some embodiments, question analyzer 214 may be a computer module that may parse a received user query and generate a corresponding data structure of the user query. For example, in response to receiving a question at QA system 212, question analyzer 214 may output the parsed question as a data structure. In some embodiments, the parsed question may be represented in the form of a parse tree or other graph structure. To generate the parsed question, question analyzer 214 may trigger computer modules 216-222. Additionally, in some embodiments, question analyzer 214 may use external computer systems for dedicated tasks that are part of the question parsing process.

In some embodiments, the output of question analyzer 214 may be used by QA system 212 to perform a search of a set of (i.e., one or more) corpora to retrieve information to answer a question posed by a user. As used herein, a corpus may refer to one or more data sources. In some embodiments, data sources 224 may include data warehouses, information corpora, data models, and document repositories. In some embodiments, the data source 224 may include an information corpus 226. The information corpus 226 may enable data storage and retrieval. In some embodiments, the information corpus 226 may be a storage mechanism that houses a standardized, consistent, clean and integrated form of data. The data may be sourced from various operational systems. Data stored in the information corpus 226 may be structured in a way to specifically address reporting and analytic requirements. In some embodiments, the information corpus may be a relational database. In some example embodiments, data sources 224 may include one or more document repositories.

In some embodiments, answer generator 228 may be a computer module that generates answers to posed questions. Examples of answers generated by answer generator 228 may include, but are not limited to, answers in the form of natural language sentences; reports, charts, or other analytic representation; raw data; web pages; and the like. In some embodiments, answers may be of audio type, image type, or any other suitable medium type.

In some embodiments, answer generator 228 may include query processor 230, visualization processor 232, and feedback handler 234. When information in a data source 224 matching a parsed question is located, a technical query associated with the pattern may be executed by query processor 230. Based on data retrieved by a technical query executed by query processor 230, visualization processor 232 may be able to render visualization of the retrieved data, where the visualization represents the answer (e.g., a candidate answer). In some embodiments, visualization processor 232 may render various analytics to represent the answer including, but not limited to, images, charts, tables, dashboards, maps, and the like. In some embodiments, visualization processor 232 may present the answer to the user.

In some embodiments, feedback handler 234 may be a computer module that processes feedback from users on answers generated by answer generator 228. In some embodiments, users may be engaged in dialog with the QA system 212 to evaluate the relevance of received answers. Answer generator 228 may produce a list of answers (e.g., candidate answers) corresponding to a question submitted by a user. The user may rank each answer according to its relevance to the question. In some embodiments, the feedback of users on generated answers may be used for future question answering sessions.

The various components of the exemplary QA system described above may be used to implement various aspects of the present disclosure. For example, the client application 208 could be used to receive an input question from a user. The question analyzer 214 could, in some embodiments, be used to analyze input queries and to categorize input queries as associated non-textual medium types. The answer generator 228 could, in some embodiments, be used to perform textual and/or non-textual-medium-type searches and to present candidate answers to users.

Figure 3A:
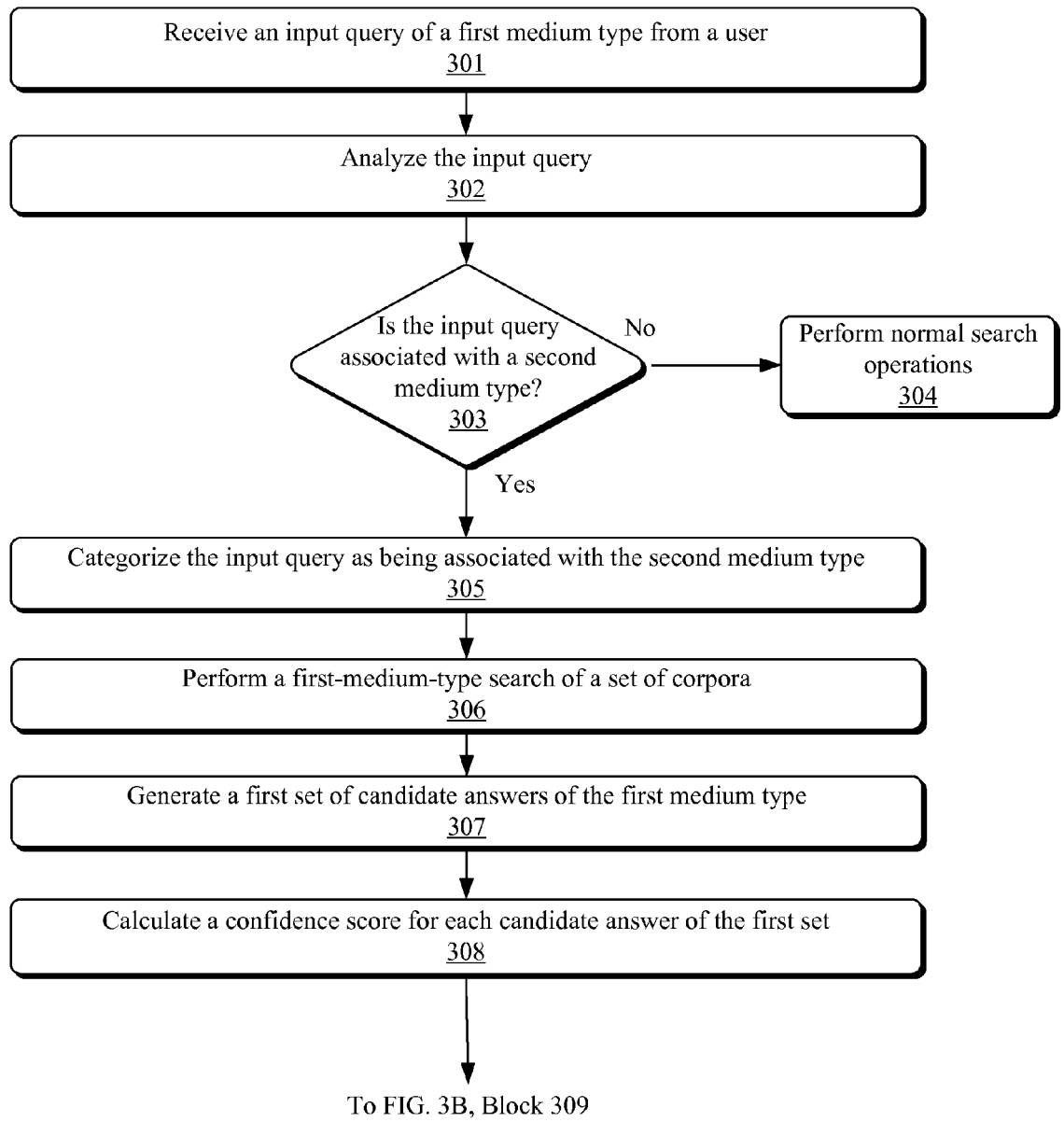
FIGS. 3A and 3B illustrate an example flowchart of a method for answering questions using a QA system, in accordance with embodiments of the present disclosure.
Figure 3B:
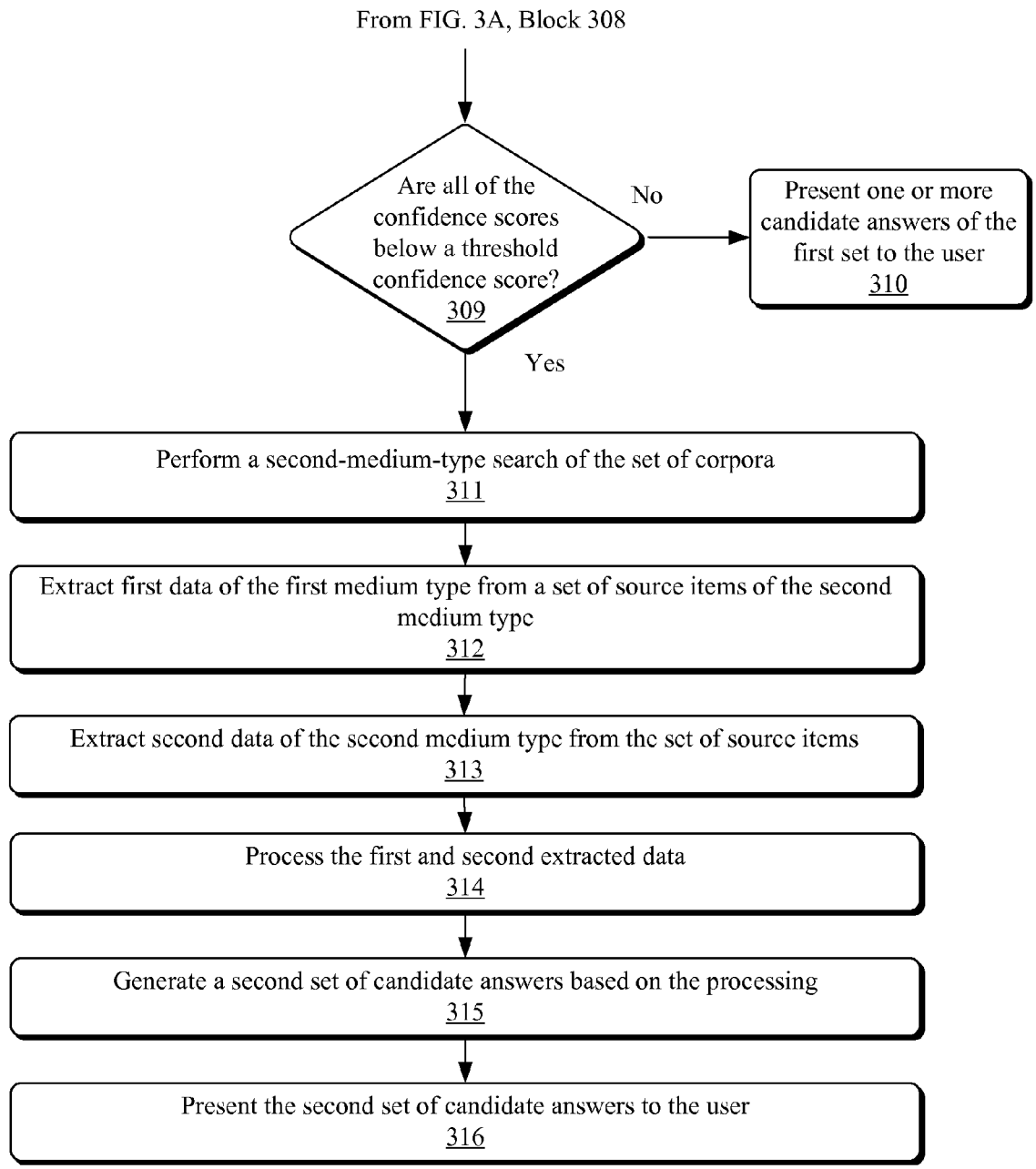

Turning now to FIGS. 3A and 3B, shown is a flowchart illustrating an example method 300 for answering questions using a QA system, in accordance with embodiments of the present disclosure. The method 300 may begin at block 301 where an input query of a first medium type is received. The input query may have originated with a user, for example, through the query module 110 of remote device 102 of FIG. 1. As used herein, a medium type of a query may refer to the format in which the query is posed by a user. Example medium types that may be used include video type, audio type, image type, or textual type. Video type may refer to moving images rendered in any viewable format. These videos may or may not incorporate sound content. An example of video-type content might be a six-second film clip of a child riding a bike. Audio type may refer to any aural content that is presented without an associated image. An example of audio-type content might include a song taken from a compact disc. Further, an example of an audio-type input query might a recording of a voice asking a specific question. Image type may refer to any still photograph, drawing, or other visual image. In some embodiments, image-type content may be rendered from video-type content (e.g., when a user has taken a single frame from a video). Textual-type content (i.e., textual content) may refer to content having a format that is intended to be read by a human (e.g., alphanumeric character strings). In some embodiments, textual-type content may be a set of words. The set of words may or may not form a sentence. The set of words may or may not include punctuation. The set of words may or may not be spelled correctly. Examples of a textual-type input query may include "Where is Petoskey?" or "Why is the sky blue?"

In some embodiments, multiple medium types may be included within a single input question. For example, a single question could include the text "What color is this shirt?" along with an image of a teal t-shirt. Further, it is contemplated that, in some embodiments, input questions may not always be received from human users and instead may be generated by computer systems or components of computer systems.

Once the input query is received, then, per block 302, the input query may be analyzed by the QA system. This analysis may be performed, for example, using question analyzer 214 of FIG. 2. The question analyzer 214 may use one or more components (e.g., components 216-222) that may be able to analyze one or more aspects of the input query. Natural language processing techniques may be particularly appropriate in situations where the input query is of a textual type. It may also be appropriate where the input query is of another type. For example, natural language processing may be used to analyze textual annotations (e.g., meta tags) associated with image-type or video-type content received as part of the input query. Furthermore, ontology-matching techniques may also be used.

In some embodiments, other techniques may also be appropriate for analyzing input queries. For example, an input query of an image type or video type may be analyzed using object recognition software designed to determine the nature of objects within a given image using edge detection, greyscale matching, gradient matching, and other related techniques. Furthermore, when audio-type content is analyzed, software having speech recognition or speaker identification software may be useful. Any other relevant techniques may also be used.

Per block 303, based on the analysis of block 302, a determination may be made as to whether the input query is associated with a second medium type. As used herein, an input query of a first medium type may be associated with a second medium type in situations where an answer to the input query is likely to be efficiently shown to a user in the format of the second medium type. The input query may also, in some embodiments, be associated with a second medium type in situations where searching content of the second medium type is likely to lead to a high quality answer to the input query. Further, in some embodiments where there is textual input query, the input query may be deemed associated with a non-textual medium type in situations where the words of the input query (either individually or together) connote, imply, or suggest a particular non-textual medium type or concepts that are generally presented in non-textual-medium-type formats. More particularly, this may occur when the words or structure of a textual input query are related to an ontology of a particular non-textual medium type. For example, words like "sound," "listen," "heard," and "noise" may indicate an association with an audio-type (e.g., because these words represent concepts that encompassed within an audio-type ontology). Further, in some embodiments, words like "look," "color," and "bright" may presume that is there is a relationship to an image type. Further, in some embodiments, actions verbs that imply changes in physical status or movement (running, dancing, growing, etc.) may mean that the textual input query is associated with a video-type. Other types of associations are also possible.

An example of an input query that is associated with a second medium type might include a written question of "What sound does a dove make?" In this example, the input query is of a textual type and the QA system may determine (e.g., using natural language processing that keys on the word "sound") that the question is associated with an audio type. Another example of an input query that is associated with a second medium type might be a question that is posed in the form of a photograph of the painting of the Mona Lisa. In this second example, the input query is of the image type and the QA system may analyze the photograph (e.g., using natural language processing of meta tags associated with the photograph or using facial recognition technology to analyze the image of the face within the painting) to determine that the query is associated with the textual type (e.g., because the QA system recognizes the image as a painting and knows that questions posed as a painting is usually best answered with the written title of the painting).

Depending on the determination made in block 303, the method 300 may continue to block 304 or block 305. If in block 303 it is determined that the input query is not associated with a second medium type, then the QA system may, per block 304, perform normal search operations in order to generate a candidate answer to the input query. These operations may be well known to those skilled in the art. If, however, in block 303, a determination is made that the input query is associated with a second medium type, then, per block 305, the input query may be categorized as being associated with the second medium type. In some embodiments, this categorization may take the form of a simple notation that is associated with the input query or its processing history.

Next, per block 306, the QA system may perform a first-medium-type search of a set of corpora. As used herein a specific medium-type search may refer to a search for (e.g., analysis of) source items of that medium type (e.g., various units of written, printed, or electronic matter that provide information or evidence) as part of generating candidate answers to an input query (of the same or different medium type). For example, an image-type search might incorporate a review and processing of all of the relevant image-type source items (photographs, drawings, etc.) that are in a particular corpus. Further, as part of such an image-type search, both visible content of each source item may be searched as well as the underlying data (e.g., both a webpage image itself and the webpage image's source code). In some embodiments, the searched corpora could contain only source items of one particular type (e.g., all audio-type source items). In other situations, the searched corpora could contain multiple different types of source items and QA system could then determine which of the source items are of the type that is relevant for a given search.

As stated herein, in this example of method 300, the search that is performed in block 306 is of the same type as the input query (e.g., if the input query is in a textual-type format then the search of block 306 is also of the textual type). This may decrease the quantity of source items that are searched or the complexity of the search process (e.g., because it may be more cost effective to search for source items that are of the same medium type as the relevant input query).

Next, per block 307, a first set of (i.e., one or more) candidate answers of the first medium type may be generated as a result of the first-medium-type search. In this context, in some embodiments, generating may refer to initially identifying a candidate answer using one or more source items, to supporting (using the one or more source items) a candidate answer that was previously generated, or both. Furthermore, in some embodiments, some potential candidate answers may be identified or generated, but later rejected or modified without becoming part of the set of candidate answers.

In some embodiments, this step of generating may be performed, for example, using answer generator 228 of FIG. 2. Further, in some embodiments, a source item may support more than one candidate answer and a candidate answer may be supported by one or more source items. Moreover, in some embodiments, a source item may itself become a candidate answer. For example, if an image-type search is performed of corpus including a picture of a house as a source item, then that picture (if relevant) could be used as a candidate answer.

At block 308, a confidence score may be calculated for each candidate answer of the first set of candidate answers. In some embodiments, each confidence score may indicate a level of confidence in a given candidate answer based on a number of factors. These factors may include, for example, the trustworthiness of a source item's publisher, the content of a source item, the content of a candidate answer, the similarity of the context of a source item with the context of an applicable user question, etc. It is contemplated that factors may be weighted differently and that not all factors may be applicable to every candidate answer. In some embodiments, a confidence rule may be used to determine confidence scores. As used herein, a confidence rule may refer to a rule (e.g., an algorithm, a set of algorithms, or a set of other procedures) that may rely on inputting values for variables, in order to output a score that may be indicative of, among potentially other things, the value of a given source item in the context of supporting a given candidate answer to a given input query.

Next, per block 309, a determination may be as to whether all of the confidence scores associated with the first set of candidate answers are below a threshold confidence score. As used herein, a threshold confidence score may be indicative of a minimal acceptable level of confidence in a particular candidate answer. Different threshold confidence scores may be used under different circumstances. If at least one of the confidence scores is above the threshold level of confidence, then, per block 310, one or more of the candidate answers (e.g., the candidate answer with the highest confidence score) may be presented to the user. If, however, all of the confidence scores are below a threshold level of confidence, then, per block 311, the QA system may perform another search of the set of corpora, with this search being a second-medium-type search. This search may, in some embodiments, be performed in the same manner as the first-medium-type search of block 306, with an exception being that this second search may be of the second medium type (i.e., the medium type with which the input query was categorized as being associated in block 305). In some embodiments, the second-medium-type search may be performed in a different corpus or set of corpora than the corpus or corpora in which the first medium type search was performed.

In block 312, either as part of the search of block 311 or separately, first data of the first medium type may be extracted from a set of source items of the second medium type (e.g., relevant source items found by the QA system during the search of the set of corpora). Similarly, in block 313, second data of the second medium type may be extracted from the set of source items. Next, per block 314 the first and second extracted data may be processed. More details regarding blocks 312-314 are discussed herein in reference to FIGS. 7 and 8. As a result of the processing, per block 315, a second set of one or more candidate answers are generated, and, per block 316, the second set of candidate answers may be presented to the user, for example, via a user interface of remote device 102 of FIG. 1. As discussed previously, not all potential candidate answers may be presented to the user, and the final version of the second set of candidate answers may be selected based on having the highest confidence scores of all of the potential candidate answers. In some embodiments, the set of candidate answers presented to the user may include only a single, best candidate answer. Further, in some embodiments, the second set of candidate answers may include candidate answers of the first medium type, the second medium type, or both. For example, a set of five candidate answers presented to a user could include three candidate answers of the first medium type and two candidate answers of the second medium type.

Many variants of method 300 are contemplated. For example, in some embodiments, the first-medium-type search of block 306 may not be comprehensive search, but rather a lesser, preliminary search used to determine whether a second-medium-type search should be performed. In some embodiments, such a preliminary search may be designed to be faster and/or less expensive (in terms of monetary costs or other resources) than normal searches that the QA system might perform under other circumstances. A preliminary search may be useful, for example, when performing a first-medium-type search is less expensive than performing a second-medium-type search and the QA system needs to determine whether performing the second-medium-type search will be necessary or worthwhile.

In another variant of method 300, in some embodiments, an input query of a first medium type may, per block 303, be determined to be associated with more than one other medium type. For example, a textual-type input question of "How do I ride a bike?" may be associated with both an image-type and a video-type. In some embodiments, in instances where more than one medium type is determined to be associated with the input query, the input query may be categorized as associated with each type and corresponding search of each type may be performed (for example, per block 311). In this bike example, both a video-type search and image-type search may be performed. Moreover, in this example, the set of candidate answers presented to the user may include all three of textual-type, video-type, and image-type responses.

In yet another variant of method 300, in some embodiments, a set of relative value criteria may be used in setting a threshold confidence level (e.g., as is shown in block 309) when determining whether to perform a second-medium-type search of the set of corpora. As used herein, relative value criteria may refer to criteria that relate to whether a second-medium-type search is worth performing. Factors that may affect relative value criteria (and, therefore, the threshold confidence score) may include the resource cost of performing a second-medium-type search, and the relative importance of answering the input query correctly. For example, a lower threshold confidence score may be used in situations where the input query relates to relatively unimportant subject matter.

In yet another variant of method 300, in some embodiments, the concept of using confidence scores to determine whether a second-medium-type search should be performed (e.g., per blocks 308 and 309) may be eliminated. For example, in some embodiments, once the input query is categorized as being associated with the second medium type (per block 305), then both the first-medium-type search and the second-medium-type search may be performed at the same time (e.g., a variant of method 300 may be used wherein blocks 307-310 are ignored and blocks 306 and 307 are combined). Further, in some embodiments where a first-medium-type search and a second-medium-type search are performed contemporaneously (e.g., as part of the same search), a single set of candidate answers (including candidate answers of the first medium type, the second medium type, or both) may be generated from the searches and presented to the user.

Figure 4:
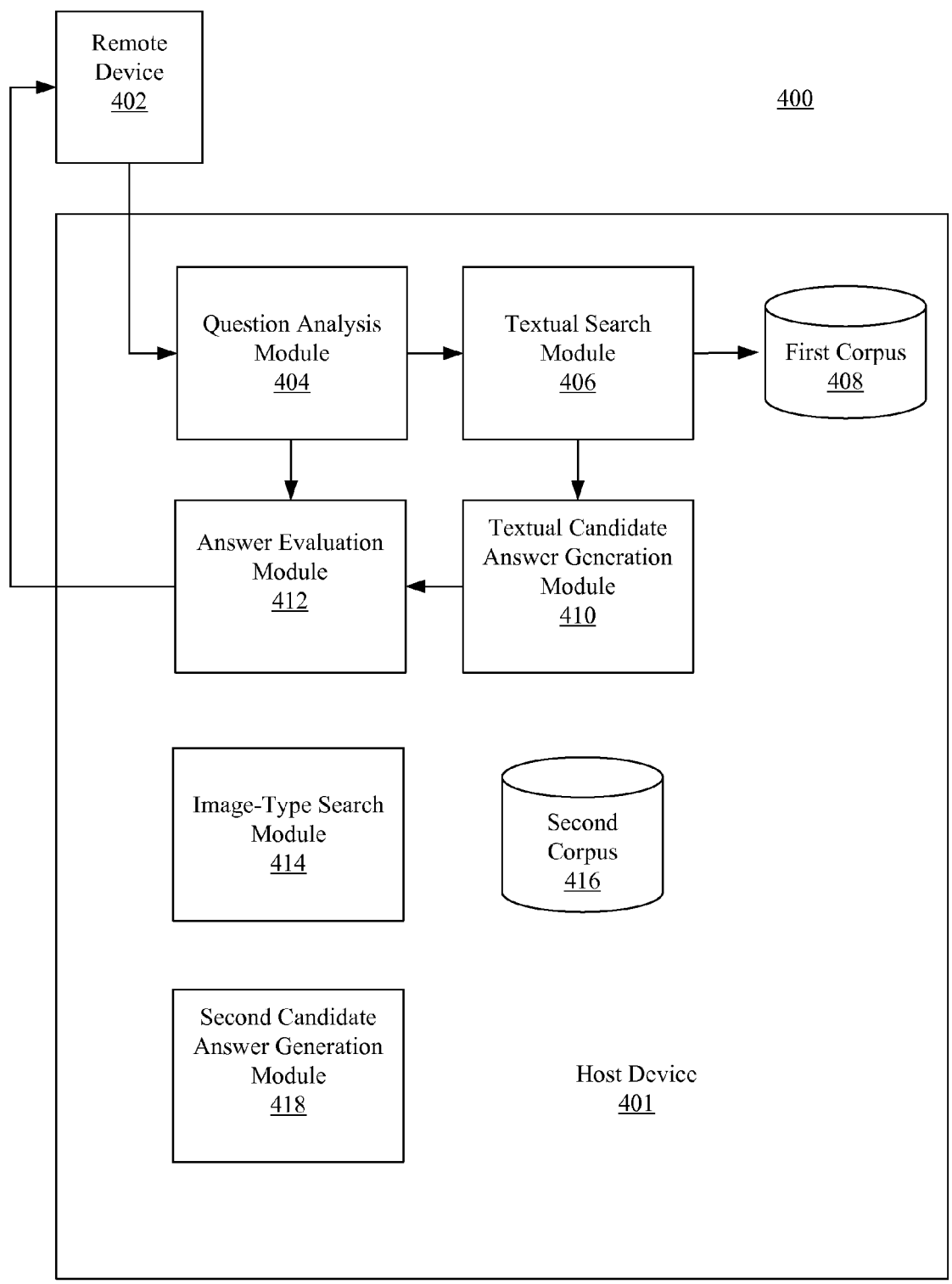
FIG. 4 illustrates a block diagram of high level logical architecture of an example QA system being used to provide a textual-type response to an example textual-type input query, in accordance with embodiments of the present disclosure.

Turning now to FIG. 4, shown is a block diagram of high level logical architecture of an example QA system being used to provide a textual response to an example textual input query, in accordance with embodiments of the present disclosure. Aspects of FIG. 4 are directed toward components and modules for use with a QA system 400. In some embodiments, host device 401 and remote device 402 may be embodied by host device 122 and remote device 102 of FIG. 1, respectively. In some embodiments, the question analysis module 404, located on host device 401, may receive a natural language question (e.g., a textual input query) from a remote device 402, and may analyze the question to produce information about the question based on the question's content and context. This may be accomplished, for example, by using components 216-222 of FIG. 2. The information produced by question analysis module 404 may include, for example, the fact that there may be an association between the input query and a second medium type, the second medium type being, in this particular case, an image type. In addition the question analysis module 404 may formulate queries and then pass these queries on to textual search module 406 which may consult various corpora (e.g., resources such as the internet or one or more knowledge resources) to retrieve textual-type source items that are relevant to answering the user question.

Further, as shown in FIG. 4, the textual search module 406 may consult first corpus 408. The textual candidate answer generation module 410 may extract, from the search results obtained by textual search module 406, potential (candidate) answers of the textual type, which it may then score (e.g., with confidence scores) and rank. The confidence scores of this first set of candidate answers may then be compared with a threshold confidence score by an answer evaluation module 412. If there are confidence scores that exceed the threshold, then one or more candidate answers may then be sent from the answer evaluation module 412 to remote device 402 for presentation to the user. If, however, none of the candidate answers exceed the threshold level of confidence, then (given that the input query was associated with the image type) the first set of textual candidate answers are not presented to the user. Instead, image-type search module 414 is used to perform an image-type search of a second corpus 416. Based on the results of this second search, second candidate generation module 418 generates a second set of candidate answers, which are then presented to the user via remote device 402.

A more specific example of the architecture of system 400 being used to answer an input query will now be provided. In this example, a user enters an input query of "What is 132 divided by 12?" in a user interface of remote device 402. The question is transmitted to host device 401, where it is received by question analysis module 404. Using various natural language processing techniques, the question analysis module 404 determines that the input query is not associated with any other medium type (e.g., any non-textual medium type). The fact that the input query has not been categorized as associated with a second medium type is transmitted to the answer evaluation module 412. The question analysis module 404, then transfers the input query, either in an unmodified form or modified, to the textual search module 406. The textual search module 406 then performs a search of first corpus 408 for relevant textual-type source items. In this instance, a textual division table is discovered in the search and used by textual candidate answer generation module 410 to obtain a candidate answer of "11". A relatively high confidence score is then calculated for the candidate answer. The candidate answer is then transmitted to the answer evaluation module 412. The answer evaluation module 412 determines that because the input query is not associated with any non-textual medium type (which fact was itself determined by question analysis module 404), other non-textual search modules should not be used. The answer evaluation module 412 then transmits the answer of "11" and the associated confidence score to the remote device 402 for presentation to the user.

Figure 5:
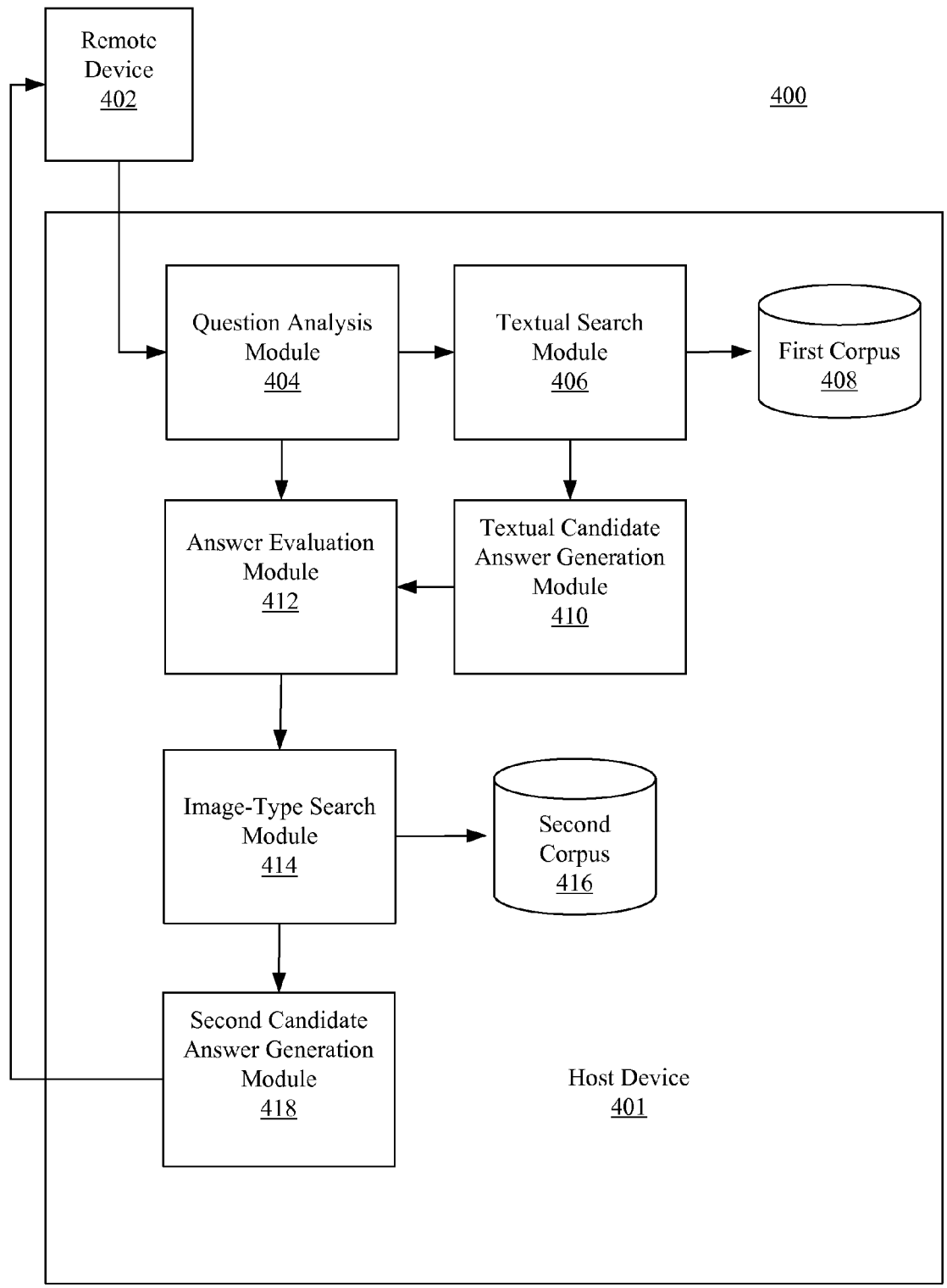
FIG. 5 illustrates the block diagram of the high level logical architecture of the example QA system shown in FIG. 4, this time being used to provide an image-type response to a different example textual-type input query, in accordance with embodiments of the present disclosure.

Turning now to FIG. 5, shown again is the block diagram of the high level logical architecture of the example QA system 400, this time being used to provide an image-type response to a different example textual input query, in accordance with embodiments of the present disclosure. In this second example, the input query received by the remote device 402 is "What does a lion look like?" This new query is transmitted to question analysis module 404. The question analysis module 404 determines that the input query is associated with an image type (e.g., because the QA system recognizes that "look" connotes an image and that a "lion" is a visible, physical object). The input query is then categorized as associated with the image-type, and notice of this categorization is transmitted to the answer evaluation module 412. The question analysis module 404 then transfers the input query to the textual search module 406. The textual search module 406 then searches the first corpus 408 for relevant textual source items. In this instance, several passages describing lions are taken from books discovered in the search and used by textual candidate answer generation module 410 to obtain a candidate answer of "a large cat." The answer, however, receives a low confidence score. The textual candidate answer is then transmitted to the answer evaluation module 412. The answer evaluation module 412 then compares the confidence score to the appropriate threshold confidence score. The answer evaluation module 412 then determines that because the confidence score associated with the textual candidate answer is below the threshold and because the input query is associated with the image type, that an image-type search should be performed. The input query is then transmitted to the image-type search module 414 which performs an image-type search of second corpus 416. A digital photograph of a lion discovered in the second search is then selected as the second candidate answer by the second candidate answer generation module 418. The lion photograph is then transmitted to remote device 402 and presented to the user as the answer to the input query.

Figure 6:
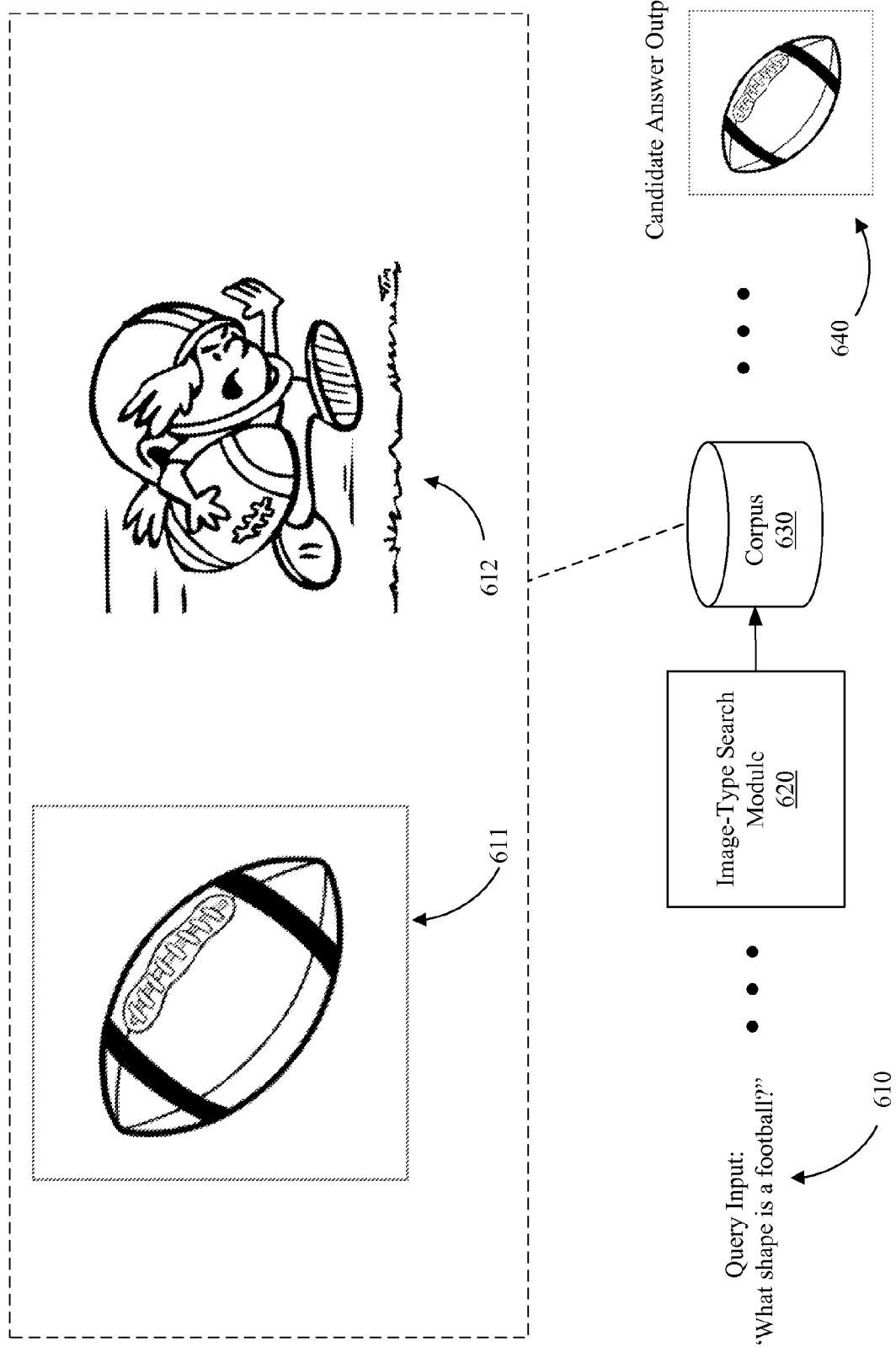
FIG. 6 illustrates a block diagram of an embodiment of a QA system using an image-type search to obtain an image-type candidate answer to an example textual input query, according to embodiments of the present disclosure.

Turning now to FIG. 6, shown is a block diagram illustrating an embodiment of a QA system using an image-type search to obtain an image-type candidate answer to a textual input query, according to embodiments of the present disclosure. In this example the query input 610 is "What shape is a football?" Because of the irregular shape of footballs, it may be likely that a satisfactory textual answer would not be produced as a result of textual search of a corpus in this particular instance. An image-type search module 620 may thus be called upon to perform an image-type search of corpus 630 (which may be the same or different corpus from the corpus in which the related textual search was performed). In this example, the search of the corpus 630 uncovers two relevant images: an image of a football alone 611 and an image of a child carrying a football 612. In this example, additional analysis may be necessary in order for the QA system to decide which of the images would be a better candidate answer to the input query 610. In this example, the image of the football alone 611 is selected and presented to user as candidate answer output 640. The image 611 may be selected over the other image, for example, because the QA system determines that the shape of the football in the second image 612 is too obscured by other objects in the image to be a satisfactory candidate answer.

Figure 7:
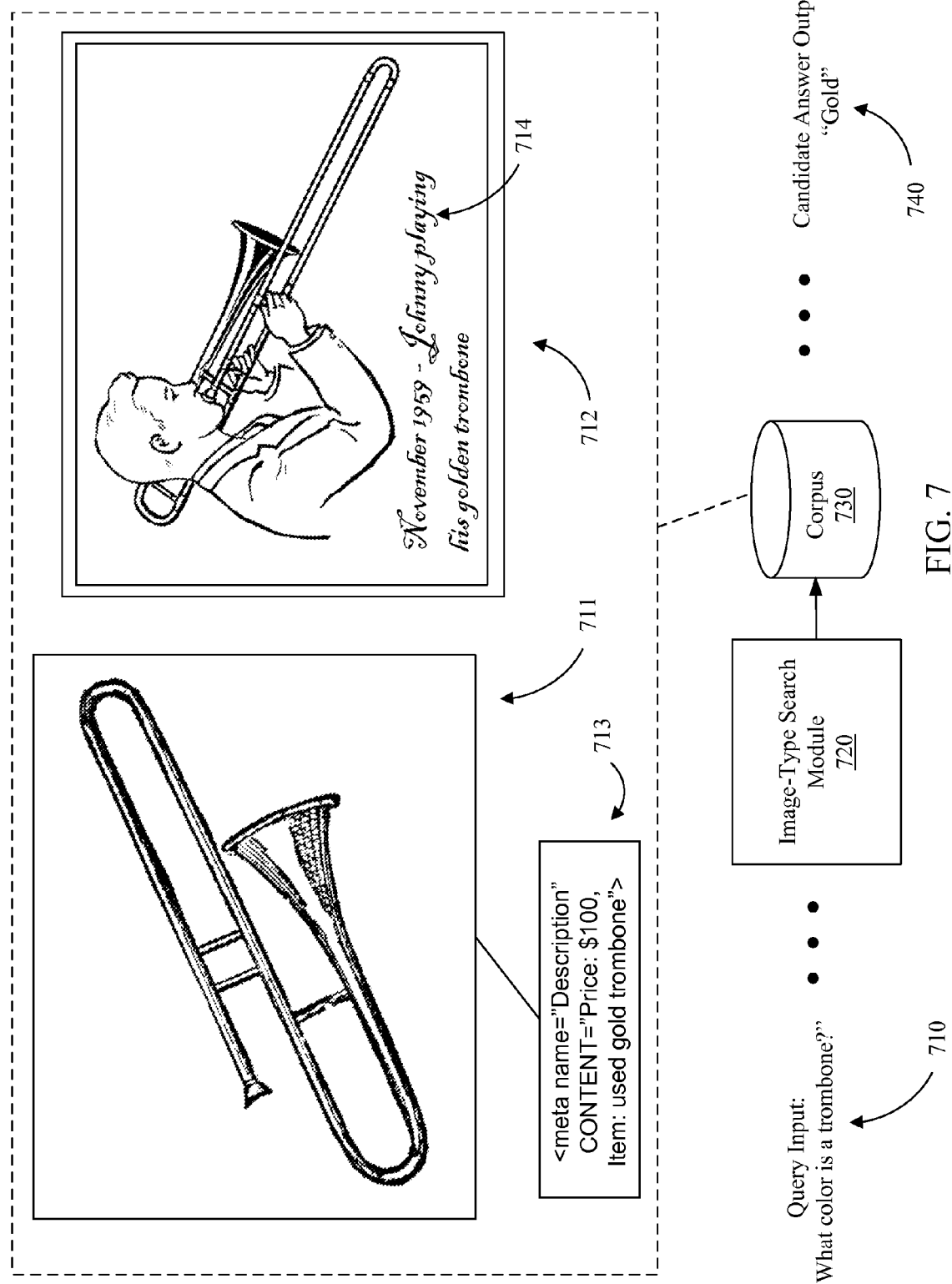
FIG. 7 illustrates a block diagram of an embodiment of a QA system using an image-type search to obtain a textual candidate answer to an example textual input query, according to embodiments of the present disclosure.

While some of the examples provided herein discuss the concept of an image-type search being used to obtain image-type answers, it is also contemplated that, in some embodiments, image-type searches may be used to generate textual answers. Turning now to FIG. 7, shown is a block diagram illustrating an embodiment of a QA system using an image-type search to obtain a textual candidate answer to a textual input query, according to embodiments of the present disclosure. In this example, the QA system may receive an input 710 of "What color is a trombone?" To continue the example, a textual type search may be performed and yield a first candidate answers with low confidence, which may prompt the system to use image-type search module 720 to perform an image-type search of corpus 730. The search of corpus 730 may yield several image-type source items, including the first image 711 of a trombone taken from an online auction website, with the auction image including a meta tag 713 having a description of the trombone, and a second image 712 that is an old photograph of a boy playing a trombone, with the photograph including a handwritten message 714 of "November 1959-Johnny playing his golden trombone." As part of the search, the image type search module may extract textual data from these image source items (e.g., meta tag 713 and handwritten message 714). This textual data may be processed (e.g., analyzed using natural language processing) to obtain a textual candidate answer output 740 of "gold." In this particular example, the answer of gold may be generated based on an analysis of the word "gold" in the meta tag 713 and the word "golden" in the handwritten message 714.

Figure 8:
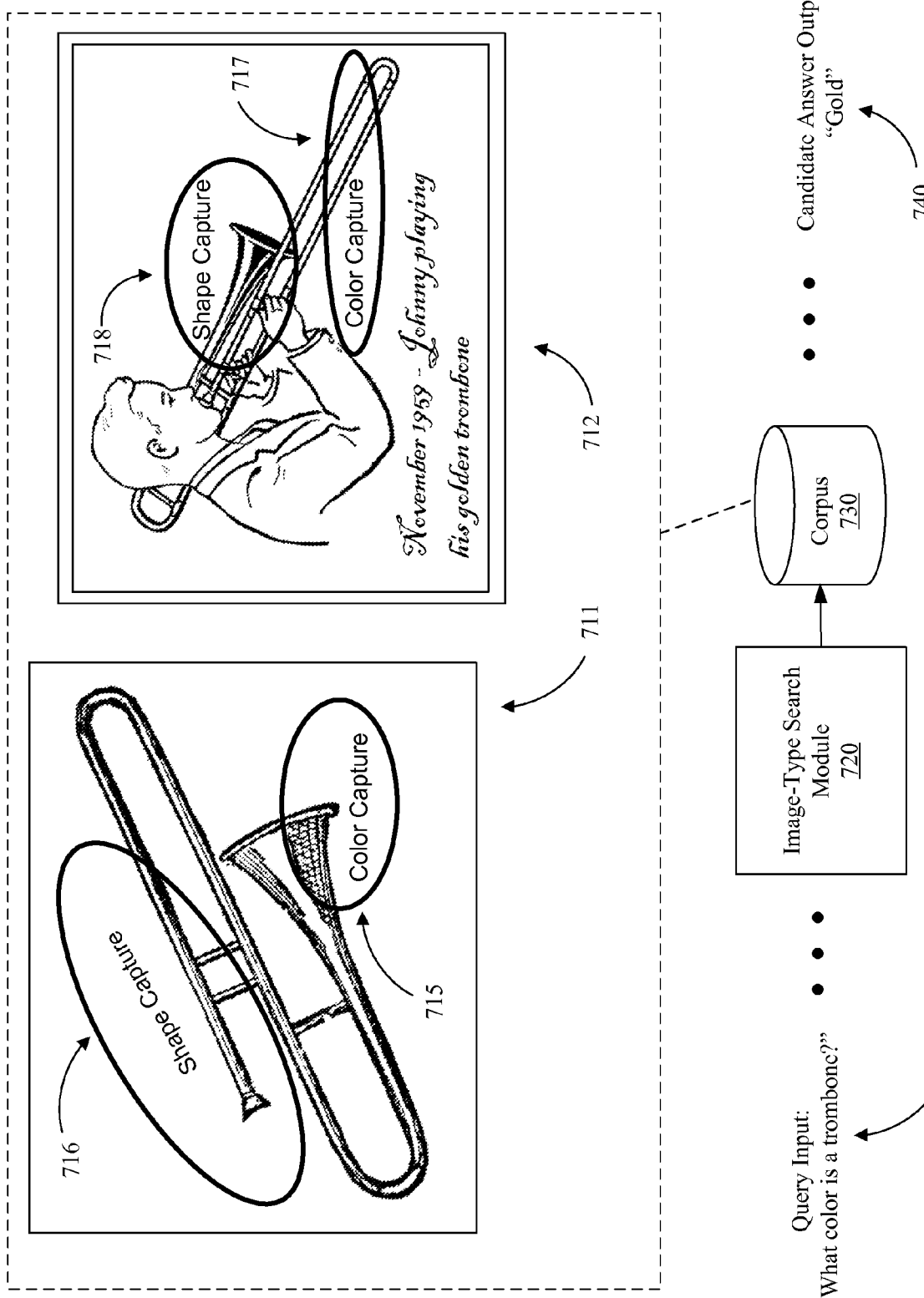
FIG. 8 illustrates a block diagram of an embodiment of a QA system using non-textual data to obtain a textual candidate answer to an example textual input query, according to embodiments of the present disclosure.

It is noted that in reference to FIG. 7, the concept of processing textual data extracted from non-textual source items (e.g., image-type source items) in order to obtain a candidate answer is shown. Other types of data (e.g., non-textual data), however, may also be used, in some embodiments. Turning now to FIG. 8, shown is a block diagram illustrating an embodiment of a QA system using non-textual data to obtain a textual candidate answer to a textual input query, according to embodiments of the present disclosure. The example shown in this figure is the same as the example of FIG. 7, except in this instance the candidate answer of "gold" is obtained by analyzing non-textual data extracted from the trombone auction image 711 and the old trombone photograph image 712 (rather by than analyzing textual data, as was done in reference to FIG. 7). In this example, image recognition software is used to perform a shape capture 716 and color capture 715 of trombone auction image 711. The shape capture 716 may result in a determination that the image includes a trombone mouthpiece and the color capture 715 may capture a gold color. Likewise, the image recognition software may perform a shape capture 718 and color capture 717 of old trombone photograph image 712. The shape capture 718 may result in a determination that the image include a trombone bell and the color capture 717 may capture a gold color. This non-textual data extracted from both images 711 and 712 may then be analyzed and used to generate a candidate answer output 740 of "gold". Furthermore, in some embodiments, the textual-data analysis of FIG. 7 may be combined with the non-textual-data analysis of FIG. 8 to yield a better candidate answer or more confidence in the candidate answer of "gold."

While the examples provided in reference to FIGS. 7 and 8 use an image-type search to obtain a textual candidate answer, it is more broadly contemplated that, in some embodiments, any first-medium-type search could be used to obtain a candidate answer of any other second medium type. For example, a video-type search could be used to generate an image-type answer (e.g., by extracting a single frame from a video source item and presenting that as an answer to the user). As another example, an audio-type search could be used to generate a textual answer (e.g., by using speech recognition software to generate writing from an audio track, which text is then presented as a candidate answer). Furthermore, in some embodiments where a second-medium-type candidate answer is provided, the results of the first-medium-type search may be added as evidence and returned to the user in order to show the answer generation process.

As discussed in more detail below, it is contemplated that some or all of the steps of some of the embodiments of methods described herein may be performed in alternative orders or may not be performed at all; furthermore, multiple steps may occur at the same time or as an internal part of a larger process. For example, per blocks 312 and 313 of method 300 of FIG. 3B, the first data and the second data may, in some embodiments, be extracted together, rather than as being extracted as part of separate steps having their own distinct outputs.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a non-transitory computer readable storage medium having program instructions embodied therewith, the program instructions executable by a computer to cause the computer to:
   receive an input query of a first medium type;
   analyze the input query;
   categorize, based on the analyzing, the input query as being associated with at least a second medium type;
   perform a first-medium-type search of a set of corpora;
   generate, as a result of the first-medium-type search, a candidate answer of the first medium type;
   calculate a confidence score for the candidate answer;
   determine that the confidence score is below a threshold confidence score; and
   perform, in response to both the determining and the categorizing, a second-medium-type search of the set of corpora.

2. A system comprising one or more circuits configured to perform a method comprising:
   receiving an input query of a first medium type;
   analyzing the input query;
   categorizing, based on the analyzing, the input query as being associated with at least a second medium type;
   performing a first-medium-type search of a set of corpora;
   generating, as a result of the first-medium-type search, a candidate answer of the first medium type;
   calculating a confidence score for the candidate answer;
   determining that the confidence score is below a threshold confidence score; and
   performing, in response to both the determining and the categorizing, a second-medium-type search of the set of corpora.

3. The system of claim 2, wherein the input query is created by a user, and wherein the one or more circuits are further configured to perform the method comprising:
   generating, as a result of the second-medium-type search, a second candidate answer; and
   presenting the second candidate answer to the user.

4. The system of claim 3, wherein the second candidate answer is of the first medium type.

5. The system of claim 3, wherein the second candidate answer is of the second medium type.

6. The system of claim 3, wherein the first medium type is a textual type, and wherein the second medium type is one of the group consisting of an image type, an audio type, and a video type.

7. The system of claim 6, wherein the set of corpora includes a set of source items of the second medium type, and wherein the performing the second-medium-type search comprises:
   extracting data from the set of source items; and
   processing the extracted data.

8. The system of claim 7, wherein the extracted data includes non-textual extracted data.

9. The system of claim 8, wherein the extracted data includes textual extracted data.

10. The system of claim 2, wherein the set of corpora includes a first corpus and a second corpus, wherein the performing the first-medium-type search is a search of the first corpus, and wherein the performing the second-medium-type search is a search of the second corpus.

11. The system of claim 2, wherein the at least the second medium type includes the second medium type and a third medium type, and wherein the one or more circuits are further configured to perform the method comprising:
   performing a third-medium-type search of the set of corpora.

12. The system of claim 2, wherein the categorizing the input query as being associated with at least a second medium type occurs in response to determining that at least a portion of the input query represents a concept encompassed within an ontology of the second medium type.

13. The system of claim 2, wherein the first medium type is a textual type, and wherein the analyzing the input query includes:
   parsing, by a natural language processing technique configured to analyze syntactic and semantic content, the input query.

14. A system comprising one or more circuits configured to perform a method comprising:
   receiving an input query of a first medium type;
   analyzing the input query;
   categorizing, based on the analyzing, the input query as being associated with at least a second medium type;
   performing a first-medium-type search of a set of corpora; and
   performing, in response to the categorizing, a second-medium-type search of the set of corpora,
   wherein the first medium type is a textual type, wherein the second medium type is an image type, wherein the set of corpora include a textual source item and further include an image-type source item, wherein the performing the first-medium-type search includes extracting a first textual data from the textual source item and further includes processing the extracted first textual data, wherein the performing the second-medium-type search includes extracting second textual data from the image-type source item and further includes processing the extracted second textual data, and wherein the one or more circuits are further configured to perform the method comprising:
   generating, based on the processing the extracted first textual data, a textual candidate answer;
   calculating a confidence score for the textual candidate answer;
   determining that the confidence score is below a threshold confidence score, wherein the performing the second-medium-type search occurs in response to both the determining and the categorizing;
   generating, based on the processing the extracted second textual data, an image-type candidate answer including the image-type source item; and
   presenting the image-type candidate answer to the user.

\* \* \* \* \*